Nov. 16, 1926.
N. MALATTI
1,606,953
FILM DEPLETION SIGNAL
Filed August 11, 1920    2 Sheets-Sheet 1
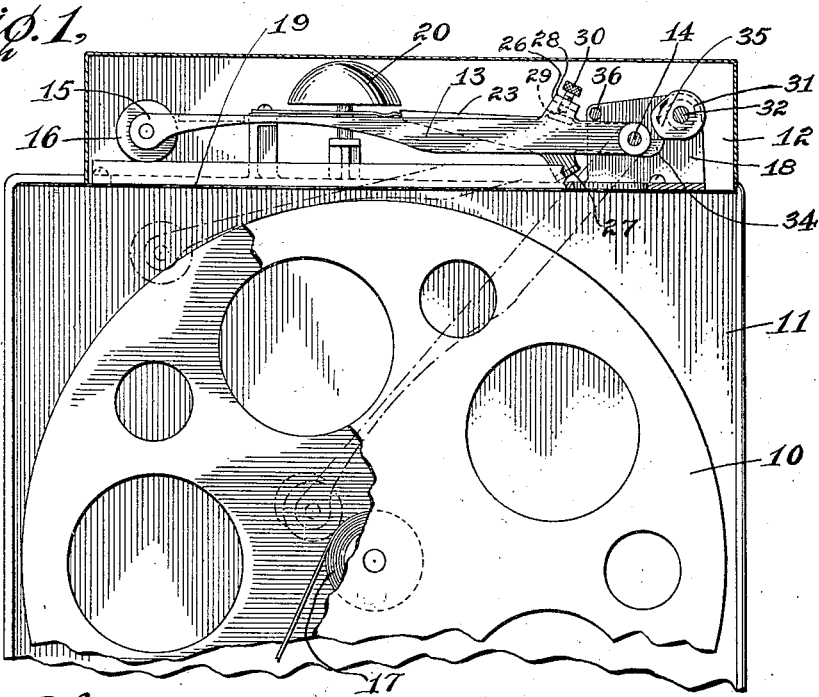
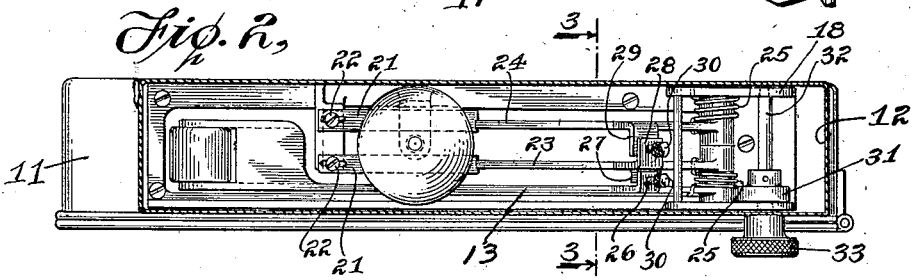
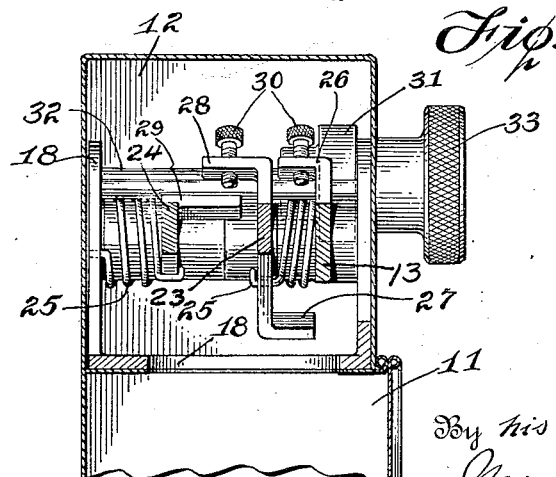
Inventor
Nichlas Malatti
By his Attorneys
Meyers, Cavanagh & Hyde

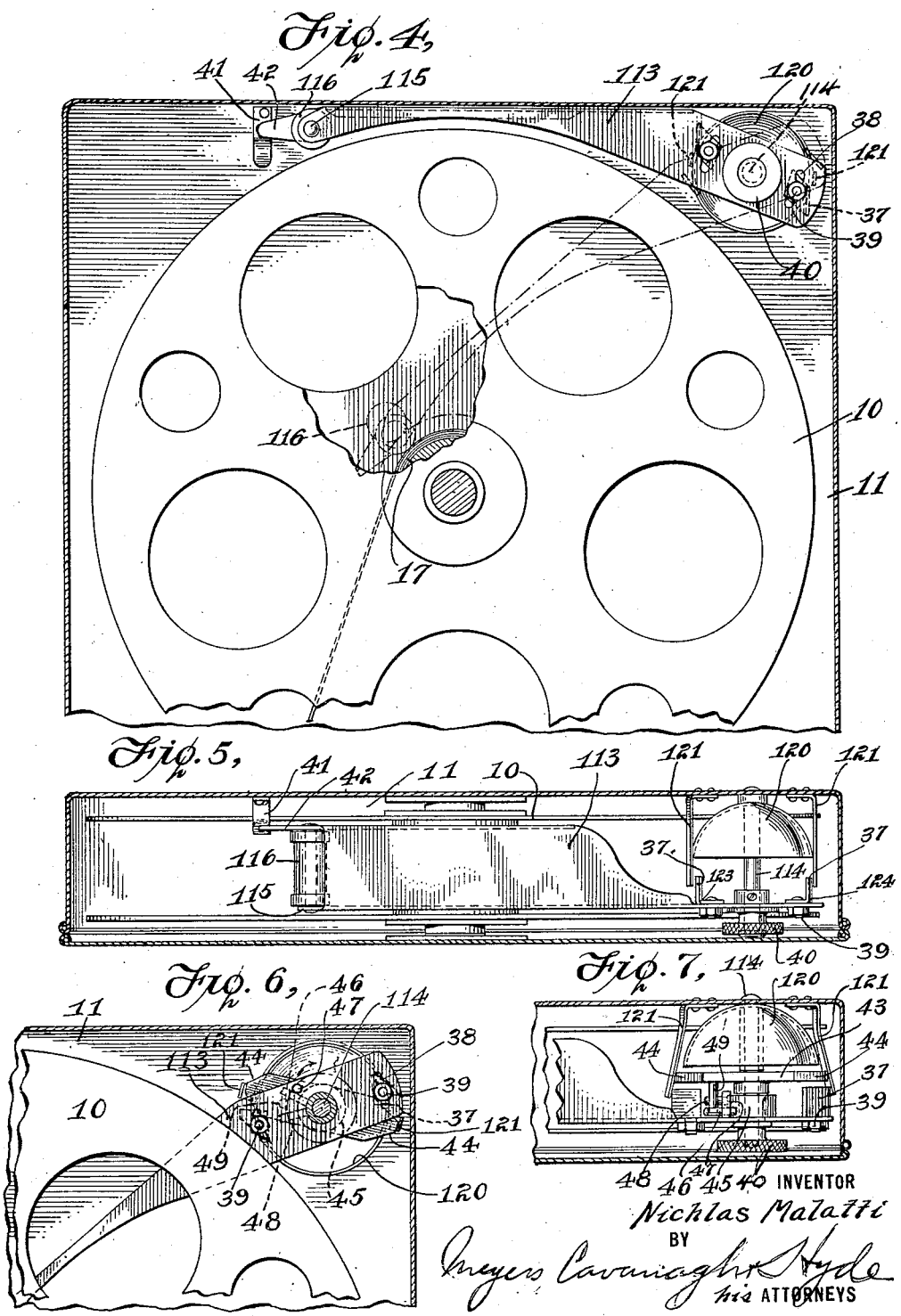

Patented Nov. 16, 1926.

1,606,953

UNITED STATES PATENT OFFICE.

NICHLAS MALATTI, OF STAMFORD, CONNECTICUT, ASSIGNOR OF ONE-HALF TO GEORGE GERONIMO, OF STAMFORD, CONNECTICUT.

FILM-DEPLETION SIGNAL.

Application filed August 11, 1920. Serial No. 402,871.

My invention relates to moving picture apparatus, and is particularly directed to a signal device for indicating predetermined points or stages in the depletion of film in a magazine or similar reel-holder.

My invention is especially intended for use in connection with magazines of the usual duplex projecting apparatus. When two machines are employed for projecting a continuous picture composed of several reels, the machines are employed alternately, one projector starting a reel just as the other projector has finished the preceding reel.

Under the present practice, the operator must rely upon his skill and alertness to make a smooth, unbroken connection between reels. It is common practice for each operator to punch holes in the film at a predetermined distance from its end, the flashing of these holes on the screen serving as a guide for the starting of the second projector. As operators vary in their requirements as to the distance from the end of the film at which such holes should be punched, the film often is so seriously damaged by the large number of perforations after it has been projected for a relatively short time that a considerable portion thereof must be cut off.

A primary object of my invention is to eliminate the necessity for punching holes in the film, and to enable the ordinary operator to produce a uniformly smooth and accurate connection between successive films, by the provision of suitable warning means adapted to give audible notice to the operator to start the second projector at a predetermined point in the projection of the preceding film near the end thereof.

As it is necessary to light up the second machine before it can be started, and as the operator must rely largely upon his judgment as to the time at which to light up, a great deal of current and arc carbon is wasted by premature lighting. A further object of my invention is to avoid this difficulty by providing a duplex signal which will warn the operator not only of the time at which to start the second projector, but also of the time at which it is necessary to light up said projector.

Another main object is to provide a signal which is relatively simple and compact, and is adapted to be used in, on, or in connection with the standard types of magazine. Another object is to provide a signal whose operation is purely mechanical and positive, thus avoiding the uncertainty and danger of electrical devices.

As operators vary to a marked extent as to the exact moments at which the signal to light up and the signal to start the projector should be given, an object of my invention is to provide a signal apparatus which is susceptible of rapid and accurate adjustment, so that each of the two signals may be regulated independently of the other to suit the desires of individual operators.

Other objects and advantages of my invention will be apparent from the following description, taken in connection with the accompanying drawings, in which:

Fig. 1 is a side elevation of one form of my invention as applied to a magazine, parts of the casing being broken away, Fig. 2 is a top plan view of the same form, the casing likewise being broken away, Fig. 3 is a transverse sectional view on line 3—3 of Fig. 2, Fig. 4 is a view similar to Fig. 1 of a modified form, Fig. 5 is a top plan view of the form shown in Fig. 4, parts of the magazine being broken away, Fig. 6 is a fragmentary detail view similar to Fig. 4 of another modification, and Fig. 7 is a fragmentary view similar to Fig. 5 of the modification shown in Fig. 6.

In Fig. 1 I have shown the usual reel 10 mounted in a rectangular magazine 11, though the form of my invention shown in said figure may be employed with magazines of circular or other forms with equal facility. I also show my device as mounted in a suitable casing 12 on the top of the magazine, though my invention is obviously not limited to such a separate arrangement. This construction, however, is convenient where the device is to be applied to magazines already in use.

I employ a swinging arm 13 pivoted adjacent one end as on pivot pin 14, so that arm 13 will swing inwardly between the walls of reel 10, the outer end 15 of arm 13 which preferably carries a roller 16 being arranged in position to maintain contact with the surface of the film 17 on reel 10, preferably maintaining its engagement with the film by gravity.

Any preferred structure for supporting arm 13 and the pivot 14 may be employed, that disclosed including a frame 18 adapted to be mounted on the top of magazine 11, the latter being provided with a longitudinal slot 19 readily cut in the upper face of the magazine, through which arm 13 swings from casing 12 into operative position in magazine 11.

Since the eyes of the operator are already heavily burdened by his usual duties, I prefer to provide an audible signal. I accomplish this object by snapping a resilient member against an element, such as bell 20, to produce a sharp sound. Said bell may be mounted in any manner desired, the form shown employing an extension of frame 18 for the purpose. As resilient elements I employ springs 21 extending longitudinally beneath bell 20, and mounted in the form shown on a suitable portion of frame 18, as by screws 22. The springs 21, which serve as hammers to strike bell 20, may be slotted or otherwise proportioned adjacent screws 22 to permit longitudinal adjustment of said springs for a purpose hereinafter indicated.

I provide means, actuated by arm 13 at predetermined points in its downward swing during the depletion of film 17, for operating successively the signal mechanism. One arrangement particularly adapted for this purpose includes a first signal lever 23 and a second signal lever 24, each of said levers being pivotally mounted at one end as on pivot pin 14, the other end of each lever engaging a spring 21, preferably by slightly overlapping the adjacent extremity of said spring. Each signal lever is normally maintained in elevated inactive position, as by coil springs 25 encircling the hubs of said levers about pivot pin 14.

I provide means for shifting each of said levers downwardly through engagement with arm 13; and in the preferred form shown I engage the first signal lever 23 directly with arm 13, and thereafter as the first arm and lever descend, I engage the first lever with the second signal lever 24, thereby actuating the second signal. For this purpose, I may employ an inwardly directed lug 26 carried by arm 13, adapted to engage an outwardly turned lug 27 on lever 23 lying in the path of lug 26 as arm 13 descends. I may employ a similar construction for interengaging lever 23 with lever 24, the rearwardly directed lug 28 on the first signal lever being adapted to engage a forwardly turned lug 29 on lever 24. This arrangement is shown most clearly in Fig. 3.

For facility in adjusting the exact point at which each signal is given, I may provide means, such as thumb screws 30 on one of each pair of contacting lugs, so arranged that by turning a thumb screw the normal distance between lugs is varied, and the point at which the signal is given is correspondingly regulated. I may also provide means for raising arm 13 to inoperative position and for maintaining it therein, preferably operable from the outside of the magazine. One convenient form includes cam 31 mounted on shaft 32 which may be journalled in frame 18, and having a knurled head 33 outside of casing 12, so that the cam 31 may be readily rotated by the operator. An extension 34 of arm 13 is positioned below cam 31, the parts being so proportioned that a counter clockwise turn of said cam will cause the projecting portion 25 thereof to engage extension 34, depressing the latter and raising arm 13 into inoperative position. Further rotation of cam 31 will bring the concentric part of said projecting portion 35 into engagement with extension 34, so that the arm 13 will be held in elevated position, as during changing of the reel 10, until knob 33 is again rotated in either direction to release said arm.

The mode of operation will be apparent, but a short summary thereof will be given. After a reel 10 has been inserted, the film 17 threaded through the machine, and the magazine closed, knob 33 is rotated, permitting arm 13 to drop so that roller 16 rests on the film in the magazine. As the film becomes depleted during operation of the projector, arm 13 swings downwardly until lug 26, or the corresponding set screw 30, engages lug 27. Further descent of arm 13 depresses the first signal lever 23 until the corresponding spring 21 snaps past the end of said lever, striking bell 20 in its upward flight and delivering the first signal. Further descent of arm 13 and lever 23 will bring lug 28, or the corresponding set screw 30, into engagement with lug 29, further descent resulting in a similar depression of signal lever 24 until the rear spring 21 snaps past the end of said lever, and striking bell 20, delivers the second signal. After the film is depleted a turn of the knob 33 will return arm 13 to inactive position and lock it therein, spring 25 being of sufficient strength to force the signal levers upwardly past springs 21 into operative position thereabove, a stop rod 36 for holding the signal levers in position against springs 25 being provided, if desired.

While the form disclosed is shown as mounted outside of the magazine, my invention obviously is not limited to this arrangement. However, I have also provided a modified construction which is primarily intended to be mounted within a rectangular magazine. This form, shown in Figures 4 to 7, likewise includes a bell 120 preferably mounted with its concave side toward the front of the magazine. The springs 121 are mounted adjacent spaced portions of the bell and parallel to the axis thereof, preferably at opposite sides, so that they will snap against the bell margin when actuated, as hereinafter set forth.

Arm 113 is mounted on pivot pin 114 coaxial with bell 120, said arm being provided if desired with a roller 116, and being mounted so that its outer end 115 will swing downwardly in contact with the film in the manner heretofore set forth. For convenience arm 113 may be made of sheet metal, this construction being desirable not merely for economy of manufacture, but also in view of the very slight clearance between the upper wall of the magazine and the largest size of reel customarily employed therein. By employing sheet metal for said arm, the latter may be sufficiently strong adjacent the upper portion of the reel 10, in view of the width of the arm at that point, without being of sufficient thickness to interfere with the insertion or removal of the reel; and the sheet metal may be twisted through 90° between the top of reel 10 and pivot 114 for convenience in mounting the arm on said pivot.

While signal tripping mechanism similar to that shown in Fig. 1 may be employed in connection with the modification illustrated in Fig. 4, I prefer to substitute therefor elements mounted directly on the arm 113 so located and proportioned that they will force each spring 121 outwardly as arm 113 descends, allowing the springs to snap back and strike the bell at the desired stages in the depletion of the film. One construction of this type is shown in Figs. 4 and 5, and includes trip members 123 and 124 mounted on arm 113 adjacent pivot pin 114, each trip member being provided with a trip arm 37. Each arm 37 is provided with a cam surface adapted to engage a spring 121 as arm 113 swings downwardly about its pivot, forcing the spring outwardly away from the bell 120 until the arm passes the spring, permitting the latter to snap back against the bell.

I may also provide means for regulating the timing of each signal independent of the other, this object preferably being accomplished by providing means for shifting the position of each trip member on arm 113. In the form disclosed I have provided a concentric slot 38 in arm 113 for each trip member, the latter being held in desired position in said slot, as by nut 39.

It will be apparent that means must also be provided for permitting the return of the trip members past the springs when arm 113 is swung upwardly into inactive position. In the form shown in Figs. 4 and 5 I have accomplished this object in substantially the same way as in the form illustrated in Fig. 1; namely, by proportioning the trip members in such a way that they will pass the springs on their return movement by forcing the springs slightly inwardly. This result is readily accomplished by providing a suitable contour for the rear face of each arm 37, as by constructing such arm from sheet metal arranged diagonally across the path of said arm about pivot 114.

For convenience in elevating arm 113 to inactive position and maintaining it there, I employ a knob 40 connected to arm 113 and preferably coaxial with spindle 114, together with a catch engaging said arm, one suitable arrangement including a spring latch 41 adapted to engage an extension 42 on said arm.

Where it is deemed inadvisable to force springs 121 inwardly, I have also provided an arrangement shown in Figs. 6 and 7 whereby the springs 121 will be forced outwardly during the return of arm 113 to permit the trip arms 37 to pass said springs. For this purpose I may employ a cam plate 43 loosely journalled on pin 114 and carrying cam faces 44 at its opposite ends adapted to force the springs 121 outwardly when said ends pass the respective springs. With this construction I journal arm 113 loosely on the hub 45 of knob 40, and provide a loose connection between said hub and arm 113, as by means of pin 46 carried by said hub and adapted to engage stud 47 on the arm 113. A similar engagement between said hub and the cam plate 43 is provided, as by means of pin 48 on the hub and stud 49 on the cam plate.

The arrangement of these parts is such that during the descent of arm 113 from its uppermost position the cam plate 43 will lag behind trip arms 37, this object being accomplished by providing sufficient frictional engagement between plate 43 and its mounting so that said plate will not swing with the descending arm 113 until stud 49 is engaged by pin 46, at which time the trip arms 37 will be substantially in advance of the cam faces 44, the signals being given clearly before said cam faces engage springs 121. This engagement occurs at the extreme end of the downward swing of arm 113, when the film is entirely removed from the reel 10, at which point the springs 121 will be held apart by cam plate 43 to a sufficient extent so that upon rotation of knob 40 to return the arm 113 to elevated position, the trip arms 37 will pass the springs before the plate 43 is shifted through engagement of pin 48 with stud 49.

While an important feature of my invention is the provision of compact mechanism adapted for the delivery of two signals both actuated by a single swinging arm, it will be apparent that when desired one of these signals may be dispensed with.

Furthermore, while it is preferable to produce the signal through striking a bell, it will be apparent that the same result will be produced through a sharp blow upon any suitable abutment or stop, which I consider to be the equivalent of the bell shown. Moreover, my invention is not limited to the particular type of spring or hammer shown, since obviously this may be varied within wide limits, it being only necessary to provide thereon a part which may be engaged by the trip element.

While I have described various forms of my invention and have indicated variations therein, it will be apparent that numerous other changes and substitutions of equivalents may be made without departing from my invention as set forth in the claims.

I claim:—

1. In film depletion signalling apparatus, signal means including a sounding element and a resilient hammer rigidly mounted at one end in normal position adjacent said sounding means, actuating means adapted to maintain contact with the outer surface of film carried by a reel and shifted along a predetermined path by the depletion of said film, and signal tripping means shifted by engagement with said actuating means through a predetermined path into engagement with the hammer to force it away from the sounding means, and thence past said hammer to permit the latter to fly back against the sounding means.

2. In a film depletion signalling apparatus, signalling means, provisions for operating said signalling means successively for producing a plurality of successive signals with a predetermined interval between the signals, means for regulating the operation of said provisions for varying the time interval between the said signals and an actuating means for operating said provisions shifted by the depletion of film upon a reel.

3. In film depletion signalling apparatus, a sounding element, a plurality of hammers adapted to strike said element, actuating means shifted by the depletion of film upon a reel, and trip means operated by said actuating means for actuating the said hammers successively to strike the sounding element for producing successive sound signals.

4. In film depletion signalling apparatus, a sounding element, a plurality of hammers adapted to strike said element, actuating means shifted by the depletion of film upon a reel, trip means operated by said actuating means for actuating the said hammers successively to strike the sounding element for producing successive sound signals, and means for adjusting the position of said trip means relative to the actuating means to vary the time at which said trip means initially engages each of the hammers.

5. In film depletion signalling apparatus, a sounding element, a plurality of resilient hammers mounted in fixed position adjacent said element, actuating means shifted by the depletion of film upon a reel, and trip means operated by said actuating means to force each of said hammers away from the sounding element and then to release the hammers successively to produce successive signals.

6. In film depletion signalling apparatus, actuating means shifted by the depletion of film upon a reel, a sounding element, a resiliently mounted hammer, and means independent of the hammer engaged by said actuating means at a predetermined point in the depletion of the film for actuating said hammer to strike the sounding element.

7. In film depletion signalling apparatus, a pivotally mounted actuating arm adapted to maintain contact at a point spaced from its pivot with a film carried by a reel, means for producing an audible signal, and an element mounted coaxially with said arm and engaged thereby at a predetermined point in the depletion of the film operative to actuate said signal producing means.

8. In film depletion signalling apparatus, a pivotally mounted actuating arm adapted to maintain contact at a point spaced from its pivot with a film carried by a reel, means for producing an audible signal including a sounding element and a hammer, a movably mounted member independent of the hammer adapted to operate said signal producing means by engagement with the hammer, and means carried by said arm for operatively engaging said movably mounted member.

9. In film depletion signalling apparatus, a pivotally mounted actuating arm adapted to maintain contact at a point spaced from its pivot with a film carried by a reel, means for producing an audible signal including a sounding element and a hammer located adjacent the path of said arm, a trip member pivotally mounted coaxially with said arm and adjacent thereto, operative to actuate said signal by engagement with the hammer, and means carried by said arm for operatively engaging said trip member at a predetermined point in the depletion of the film.

10. In film depletion signalling apparatus, a pivotally mounted actuating arm adapted to maintain contact at a point spaced from its pivot with a film carried by a reel, means for producing an audible signal including a sounding element and a hammer located adjacent the path of said arm, a trip member pivotally mounted coaxially with said arm and adjacent thereto, operative to actuate said signal by engagement with the hammer, means carried by said arm for operatively engaging said trip member at a predetermined point in the depletion of the film, and means for varying the depletion point at which said arm will engage the signal actuating member.

11. In film depletion signalling apparatus, actuating means shifted by the depletion of film upon a reel, means for producing an audible signal, a pair of signal actuating members, means for actuating the first member from said actuating means at a predetermined point in the depletion of the film, and means for thereafter operatively interengaging said first member with the second member.

12. In film depletion signalling apparatus, an actuating arm shifted by the depletion of film upon a reel, means for producing an audible signal, a pair of signal operating members mounted to move in planes parallel to and adjacent the path of said arm, fixed means for operatively connecting said arm and an adjacent member at a predetermined point in the depletion of the film to shift said member and operate the signal, and means rendered operative by the shifting of said first member to connect the latter with the second member and operate the signal means.

13. In a feed magazine for a motion picture machine, the combination with a reel, of a film wound thereon, a lever riding on the edge of said film, and means operated by the downward angular movement of said lever for sounding an alarm bell successively.

Signed at Stamford in the county of Fairfield and State of Connecticut this 7th day of August A. D. 1920.

NICHLAS MALATTI.